G. McKNIGHT.
Automatic Gate.
No. 61,676.
Patented Jan. 29, 1867.
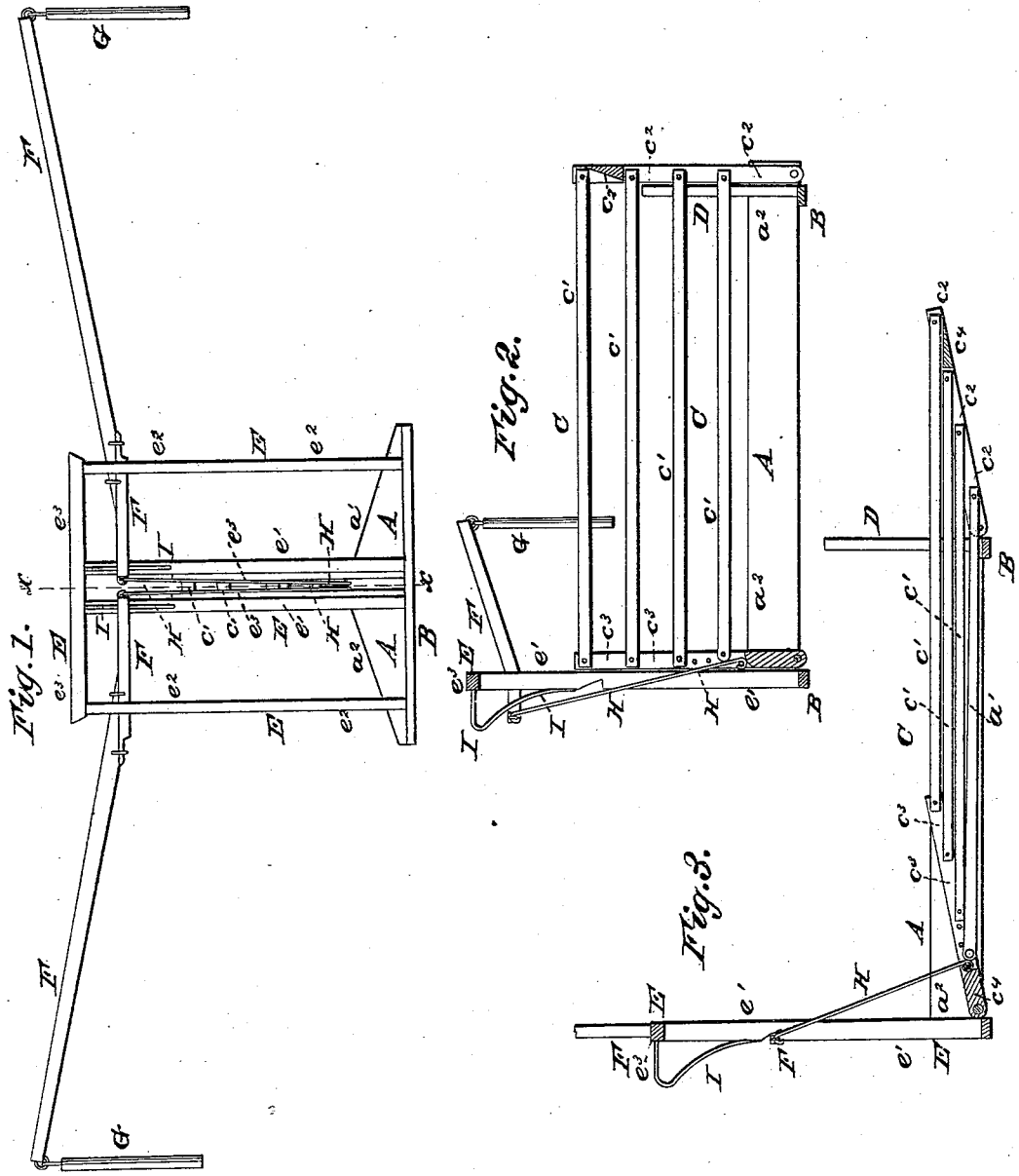

United States Patent Office

GEORGE McKNIGHT, OF HEBRON, NEW YORK.

Letters Patent No. 61,676, dated January 29, 1867.

---

IMPROVEMENT IN GATES.

---

The Schedule referred to in these Letters Patent and making part of the same.

---

TO ALL WHOM IT MAY CONCERN:

Be it known that I, GEORGE McKNIGHT, of Hebron, in the county of Washington, and State of New York, have invented a new and useful Improvement in Gates; and I do hereby declare that the following is a full, clear, and exact description thereof, which will enable others skilled in the art to make and use the same, reference being had to the accompanying drawings forming part of this specification, in which—

Figure 1 is a rear end view of my improved gate when raised or shut.

Figure 2 is a vertical longitudinal section of the same taken through the line $x\,x$, fig. 1.

Figure 3 is the same view as fig. 2, but showing the gate lowered or opened.

Similar letters of reference indicate like parts.

My invention has for its object to furnish an improved gate, simple in construction, readily operated, and which, when lowered or opened, shuts down entirely out of the way.

And it consists, first, in the combination of the gate, constructed as hereinafter described, with the framework or planking that forms the ground-frame of the gate; and second, in the combination and arrangement of the levers, connecting-rods, upright frame, and inclines with each other, with the gate, and with the ground-frame or planking upon which the gate rests.

A is the ground-frame or planking that supports the gate. This framework or planking is in the form of a double inclined plane, having a longitudinal opening along its ridge or highest part, of a depth equal to the united breadth of all the horizontal bars of the gate, and of a breadth equal to the thickness of the gate-frame. When the gate is placed over a trench or ditch, the frame or planking A rests upon sills B, extending across said trench or ditch. In other situations the frame or planking may rest upon the ground or upon a stone foundation prepared for it. C is the gate, the length, height, and size of the timbers of which will depend upon the circumstances of each case. The drawings represent a gate eleven feet long and four feet high, and the other parts will be described in proportion with said dimensions. The horizontal bars $c^1$ of the gate C are pivoted at each end between two vertical strips or bars $c^2$ and $c^3$. These bars may be kept apart, so that they will not cramp the ends of the horizontal bars $c^1$, by blocks $c^4$, of such a shape and size that they will not interfere with the movement of said bars. The lower end of the bars $c^2$ and $c^3$ are pivoted to the framework or planking A at the lower edge of the opening, between the parts $a^1$ and $a^2$ thereof, so that the gate when opened may fold down into said opening and be wholly out of the way of the passing vehicle. D are posts or standards attached to the framework or planking A at the forward end of the gate C, to sustain the said forward end of the gate, when open, against side pressure, and which at the same time serve as guides to the gate while being opened and closed. E is a vertical frame, the lower ends of the two central posts $e^1$ of which are attached to the framework or planking A, at the rear end of the gate C; and the lower ends of the two outer posts $e^2$ are attached to the framework or planking A near its outer edges, as shown in fig. 1. The upper ends of the posts $e^1$ and $e^2$ are connected and held in their proper relative positions by the cross-beam $e^3$, as shown. F are levers twelve feet in length, pivoted in slots in the upper ends of the outer posts $e^2$ of the frame E. The outer or free ends of these levers stand at the height of seven feet above the roadway when the gate is closed, and when the gate is open rise to the height of eleven feet above said roadway. To the said outer ends of the levers F are pivoted the upper ends of the handles G, the lower ends of which hang down so that the levers may be operated and the gate opened or closed either from the ground or from a passing vehicle. To the inner ends of the levers F are pivoted the upper ends of the connecting-rods H, the lower ends of which are pivoted to the vertical bars $c^3$ of the gate C, near their lower ends, as shown in figs. 2 and 3. I are inclines attached to the outer sides of the posts $e^1$ to guide the inner ends of the levers F, while operating, into such a position that the rods H may operate advantageously upon the gate C in opening and closing it. It should also be observed that the levers F should be pivoted in such a position that their outer ends may project so far over the roadway that the handles G can be easily reached from a vehicle upon the said roadway.

By this construction and arrangement of the different parts of the gate, when approaching the said gate from either side, by raising the outer end of the lever F by means of the handle G, the gate C will be opened or folded down into the opening between the parts $a^1$ and $a^2$ of the ground-frame or planking A; and after passing through the gateway, by drawing down the outer end of the other lever F by means of the other handle G, the gate will be raised or closed behind the vehicle.

What I claim as new, and desire to secure by Letters Patent, is—

1. The combination of the gate C, when constructed as herein described, with the ground-frame or planking A, substantially as and for the purpose set forth; and 2. The combination and arrangement of the levers F, connecting-rods H, upright frame E, and inclines I, with each other, with the gate C, and with the ground-frame or planking A, substantially as herein described and for the purpose set forth.

GEORGE McKNIGHT.

Witnesses:
    THOMAS MAHAFFY,
    JOHN A. McKNIGHT.